United States Patent
Lu et al.

(10) Patent No.: US 11,302,916 B2
(45) Date of Patent: Apr. 12, 2022

(54) METHODS TO STABILIZE LITHIUM TITANATE OXIDE (LTO) BY ELECTROLYTE PRETREATMENT

(71) Applicant: GM GLOBAL TECHNOLOGY OPERATIONS LLC, Detroit, MI (US)

(72) Inventors: Peng Lu, Santa Clara, CA (US); Michael P. Balogh, Novi, MI (US); Zhiqiang Yu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 16/491,488

(22) PCT Filed: Mar. 13, 2017

(86) PCT No.: PCT/CN2017/076453
§ 371 (c)(1),
(2) Date: Sep. 5, 2019

(87) PCT Pub. No.: WO2018/165824
PCT Pub. Date: Sep. 20, 2018

(65) Prior Publication Data
US 2020/0020939 A1    Jan. 16, 2020

(51) Int. Cl.
*H01M 4/485* (2010.01)
*H01M 10/0525* (2010.01)
(Continued)

(52) U.S. Cl.
CPC ........... *H01M 4/485* (2013.01); *H01M 4/131* (2013.01); *H01M 10/0525* (2013.01);
(Continued)

(58) Field of Classification Search
CPC ........ H01M 4/485; H01M 4/58; H01M 4/134; H01M 4/1391; H01M 4/1397;
(Continued)

(56) References Cited

U.S. PATENT DOCUMENTS 5,168,019 A * 12/1992 Sugeno ............. H01M 10/0567
429/231.95
8,399,138 B2    3/2013 Timmons
(Continued)

FOREIGN PATENT DOCUMENTS

CN    110603672 A    12/2019
CN    110603679 A    12/2019
(Continued)

OTHER PUBLICATIONS

U.S. National Phase Application of PCT/CN2017/076454, filed Sep. 5, 2019, Peng Lu et al., Methods to stabilize lithium titanate (LTO) by surface coating.
(Continued)

*Primary Examiner* — Matthew W Van Oudenaren
(74) *Attorney, Agent, or Firm* — Harness, Dickey & Pierce, P.L.C.

(57) ABSTRACT

An electrolyte can be pretreated by contacting with an oxide species (e.g., $SiO_2$, $SiO_x$, where $1 \le x \le 2$, $TiO_2$). The electrolyte comprises $LiPF_6$ and a carbonate solvent. A reaction occurs to form a pretreated electrolyte comprising a compound selected from the group consisting of: $M_aP_{x'}O_yF_z$, $M_aP_{x'}O_yF_zC_nH_m$, and combinations thereof, where when P in the formula is normalized to 1 so that x' is equal to about 1, $0<y\le4$, $0<z\le6$, $0\le a\le3$, $0 \le n\le20$, $0\le m\le42$, and M is selected from Li, Na, K, Mg, Ca, B, Ti, Al, and combinations thereof. Lithium-ion electrochemical cells including lithium titanate oxide (LTO) using such a pretreated electrolyte have reduced reactivity and gas formation.

20 Claims, 4 Drawing Sheets (51) Int. Cl.
*H01M 10/0568* (2010.01)
*H01M 10/0569* (2010.01)
*H01M 4/131* (2010.01)

(52) U.S. Cl.
CPC ... *H01M 10/0568* (2013.01); *H01M 10/0569* (2013.01); *H01M 2300/0025* (2013.01)

(58) Field of Classification Search
CPC ............. H01M 4/131; H01M 10/0568; H01M 10/0569; H01M 2300/0025; H01M 2300/0028; H01M 2300/004; H01M 2300/0042
See application file for complete search history.

(56) References Cited

U.S. PATENT DOCUMENTS

| | | |
|---|---|---|
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 9,012,075 B2 | 4/2015 | Verbrugge et al. |
| 9,034,519 B2 | 5/2015 | Xiao et al. |
| 9,059,451 B2 | 6/2015 | Xiao et al. |
| 9,093,705 B2 | 7/2015 | Xiao et al. |
| 9,142,830 B2 | 9/2015 | Xiao et al. |
| 9,362,551 B2 | 6/2016 | Sachdev et al. |
| 9,362,552 B2 | 6/2016 | Sohn et al. |
| 9,531,004 B2 | 12/2016 | Xiao et al. |
| 9,583,767 B2 | 2/2017 | Verbrugge et al. |
| 10,164,245 B2 | 12/2018 | Huang |
| 10,326,136 B2 | 6/2019 | Xiao et al. |
| 2003/0077517 A1 | 4/2003 | Nakanishi et al. |
| 2007/0048617 A1 | 3/2007 | Inda |
| 2009/0253042 A1 | 10/2009 | Sun et al. |
| 2010/0143790 A1 | 6/2010 | Inagaki et al. |
| 2011/0076557 A1 | 3/2011 | Ishii et al. |
| 2012/0100403 A1 | 4/2012 | Wang et al. |
| 2012/0328927 A1 | 12/2012 | Timmons et al. |
| 2013/0099159 A1 | 4/2013 | Halalay et al. |
| 2014/0038059 A1 | 2/2014 | Li et al. |
| 2014/0113197 A1 | 4/2014 | Xiao et al. |
| 2014/0377657 A1 | 12/2014 | Lim et al. |
| 2015/0372348 A1 | 12/2015 | Buqa et al. |
| 2016/0308217 A1 | 10/2016 | Liu et al. |
| 2017/0098817 A1 | 4/2017 | Yu et al. |
| 2018/0358656 A1 | 12/2018 | Deng |
| 2018/0366771 A1 | 12/2018 | Deng |
| 2020/0035998 A1 | 1/2020 | Lu et al. |

FOREIGN PATENT DOCUMENTS

| | | |
|---|---|---|
| DE | 112017007079 T5 | 11/2019 |
| DE | 112017007080 T5 | 12/2019 |
| JP | 2016143642 A | 8/2016 |
| WO | 2018023527 A1 | 2/2018 |
| WO | 2018165825 A1 | 9/2018 |

OTHER PUBLICATIONS

International Search Report and Written Opinion for International Application No. PCT/CN2017/076453 dated Aug. 28, 2017, 6 pages (ISA/CN).

International Search Report and Written Opinion for International Application No. PCT/CN2017/076454 dated Dec. 22, 2017, 7 pages (ISA/CN).

* cited by examiner

METHODS TO STABILIZE LITHIUM TITANATE OXIDE (LTO) BY ELECTROLYTE PRETREATMENT

CROSS-REFERENCE TO RELATED APPLICATIONS

This application is a U.S. National Phase Application under 35 U.S.C. 371 of International Application No. PCT/CN2017/076453 filed on Mar. 13, 2017 and published in English as WO 2018/165824 A1 on Sep. 20, 2018. The entire disclosure of the above application is incorporated herein by reference.

INTRODUCTION

This section provides background information related to the present disclosure which is not necessarily prior art.

The present disclosure relates to pretreatment of electrolytes to enhance stability in lithium-ion electrochemical cells having lithium titanate oxide (LTO) electroactive materials to suppress gas generation.

High-energy density, electrochemical cells, such as lithium-ion batteries can be used in a variety of consumer products and vehicles. Typical lithium-ion batteries comprise a first electrode, such as a positive electrode or cathode, a second electrode such as a negative electrode or an anode, an electrolyte material, and a separator. Often a stack of lithium-ion battery cells are electrically connected to increase overall output. Conventional lithium-ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

The negative electrode typically includes a lithium insertion material or an alloy host material. Typical electroactive materials for forming an anode include lithium-graphite intercalation compounds, lithium-silicon intercalation compounds, lithium alloys and lithium titanate $Li_{4+x}Ti_5O_{12}$, where $0 \leq x \leq 3$, such as $Li_4Ti_5O_{12}$ (LTO), which may be a nano-structured LTO. LTO is a particularly desirable negative electrode battery. LTO desirably has certain advantages, like high cut voltage (e.g., cut-off potentials relative to a lithium metal reference potential) that desirably minimizes or avoids solid electrolyte interface (SEI) formation. Furthermore, LTO is a zero-strain material having minimal volumetric change during lithium insertion and deinsertion, thus enabling long term cycling stability, high current efficiency, and high rate capabilities. Such long term cycling stability, high current efficiency, and high rate capabilities are particularly advantageous for power battery and start-stop battery use.

However, while LTO is a promising anode material for high power lithium-ion batteries, providing extremely long life and high tolerance to overcharge and thermal abuse, in certain circumstances, when used with certain cathode materials and electrolytes, LTO may potentially have certain disadvantages. For example, $Li_{4+x}Ti_5O_{12}$ can generate significant quantities of gas, which mainly includes hydrogen, within a battery cell especially at elevated temperature conditions under charging state. Thus, batteries incorporating LTO negative electrodes may be subjected to a high temperature aging process to reduce gas formation and improve long-term capacity retention. For example, a battery having an LTO electrode can be aged at about 70° C. for a week under applied potential at 100% state of charge (SOC) in one exemplary high temperature aging process. However, high temperature aging can reduce initial battery capacity by about 10% or more. It would be desirable to suppress gas formation without requiring such aging processes and to employ the desirable aspects of the LTO material that provide durable batteries with sustained high capacity, high discharge rates, and long life.

SUMMARY

This section provides a general summary of the disclosure, and is not a comprehensive disclosure of its full scope or all of its features.

In certain variations, the present disclosure relates to a method of pretreating an electrolyte for a lithium-ion electrochemical cell. The method optionally includes contacting an electrolyte including lithium hexafluorophosphate ($LiPF_6$), lithium tetrafluoroborate ($LiBF_4$), and combinations thereof and a carbonate solvent with an oxide species. The oxide species is selected from the group consisting of: silicon dioxide ($SiO_2$), silicon oxides ($SiO_x$), where $1 \leq x \leq 2$, titanium dioxide ($TiO_2$), lithium oxide ($Li_2O$), sodium oxide ($Na_2O$), potassium oxide ($K_2O$), magnesium oxide (MgO), calcium oxide (CaO), barium oxide (BaO), aluminum oxide ($Al_2O_3$), and combinations thereof. A reaction occurs to form a pretreated electrolyte including a compound selected from the group consisting of: $M_aP_xO_yF_z$, $M_aP_xO_yF_zC_nH_m$, and combinations thereof, where when P in the formula is normalized to 1 so that x' is equal to about 1, $0<y\leq4$, $0<z\leq6$, $0\leq a\leq3$, $0\leq n\leq20$, $0\leq m\leq42$, and M is selected from the group of elements: lithium (Li), sodium (Na), potassium (K), magnesium (Mg), calcium (Ca), barium (Ba), titanium (Ti), aluminum (Al), and combinations thereof.

In one aspect, the oxide species is selected from the group consisting of: silicon dioxide ($SiO_2$), silicon oxides ($SiO_x$), where $1 \leq x \leq 2$, titanium dioxide ($TiO_2$), and combinations thereof.

In one aspect, the contacting occurs for greater than or equal to about 30 minutes to less than or equal to about 72 hours.

In one aspect, the contacting occurs at a temperature of greater than or equal to about 45° C. to less than or equal to about 120° C.

In one aspect, the oxide species is in a powder form including a plurality of particles and the contacting includes mixing the plurality of particles with the electrolyte.

In one aspect, the method further includes filtering the electrolyte after the contacting.

In one aspect, a filter includes the oxide species and the contacting includes passing the electrolyte through the filter.

In one aspect, the compound is represented by $P_xO_yF_z$ including fluorine (F) at greater than or equal to about 19% by weight to less than or equal to about 67% by weight.

In one aspect, the compound is represented by $M_aP_xO_yF_z$ including fluorine (F) at greater than or equal to about 6% by weight to less than or equal to about 59% by weight.

In one further aspect, M is lithium (Li).

In one aspect, the compound is represented by $P_xO_yF_zC_nH_m$ including fluorine (F) at greater than or equal to about 4% by weight to less than or equal to about 50% by weight.

In one aspect, the compound is represented by $M_aP_xO_yF_zC_nH_m$ including fluorine (F) at greater than or equal to about 1% by weight to less than or equal to about 48% by weight.

In one further aspect, M is lithium (Li).

In one aspect, the oxide species includes titanium dioxide ($TiO_2$) and the pretreated electrolyte further includes titanium tetrafluoride ($TiF_4$).

In one aspect, the oxide species includes silicon dioxide ($SiO_2$).

In one aspect, the contacting includes introducing the oxide species into an electrolyte and the oxide species is present in the electrolyte at greater than or equal to about 0.1% by weight to less than or equal to about 30% by weight.

In one aspect, the oxide species is provided in a filter and the contacting includes passing the electrolyte through the filter, where the oxide species is present in the filter at greater than or equal to about 50% by weight up to about 100% by weight.

In other variations, the present disclosure provides a method of forming a lithium-ion electrochemical cell. The method includes pretreating an electrolyte including lithium hexafluorophosphate ($LiPF_6$), lithium tetrafluoroborate ($LiBF_4$), and combinations thereof and a carbonate solvent by contacting the electrolyte with an oxide species. The oxide species is selected from the group consisting of: silicon dioxide ($SiO_2$), silicon oxides ($SiO_x$), titanium dioxide ($TiO_2$), lithium oxide ($Li_2O$), sodium oxide ($Na_2O$), potassium oxide ($K_2O$), magnesium oxide (MgO), calcium oxide (CaO), barium oxide (BaO), aluminum oxide ($Al_2O_3$), and combinations thereof. A reaction thus occurs to form a pretreated electrolyte including a compound selected from the group consisting of: $M_aP_xO_yF_z$, $M_aP_xO_yF_zC_nH_m$, and combinations thereof, where when P in the formula is normalized to 1 so that x' is equal to about 1 (x'=1), $0<y\leq 4$, $0<z\leq 6$, $0\leq a\leq 3$, $0\leq n\leq 20$, $0\leq m\leq 42$, and M is selected from the group of elements: lithium (Li), sodium (Na), potassium (K), magnesium (Mg), calcium (Ca), barium (Ba), titanium (Ti), aluminum (Al), and combinations thereof. The method also includes introducing the pretreated electrolyte into a lithium-ion electrochemical cell including a negative electrode. The negative electrode includes $Li_{(4+x)}Ti_5O_{12}$ (LTO), where $0\leq x\leq 3$. The lithium-ion electrochemical cell also includes a positive electrode and a separator. The compound present in the pretreated electrolyte minimizes reaction of reactive species with the LTO and suppresses gas formation during lithium-ion electrochemical cell operation.

In one aspect, the lithium-ion electrochemical cell has an initial charge capacity of greater than or equal to about 0.117 A·h.

In one aspect, the oxide species is selected from the group consisting of: silicon dioxide ($SiO_2$), silicon oxides ($SiO_x$), where $1\leq x\leq 2$, titanium dioxide ($TiO_2$), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings.

Figure 1:
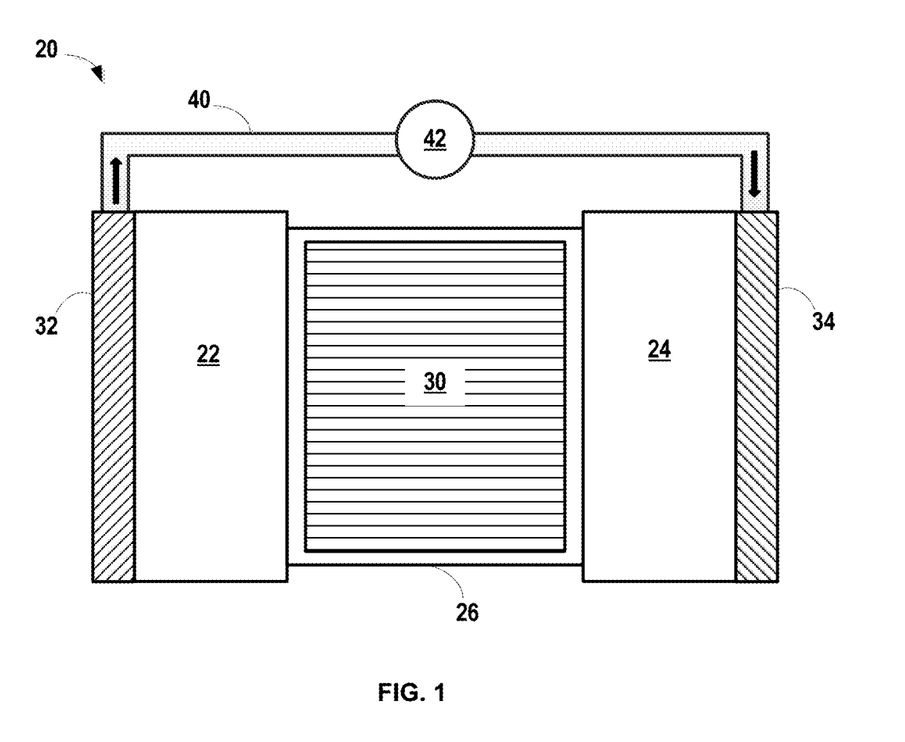
FIG. 1 is a schematic of an exemplary electrochemical battery for purposes of illustration.

An exemplary illustration of a lithium-ion battery 20 is shown in FIG. 1. Lithium-ion battery 20 includes a negative electrode 22, a positive electrode 24, and a separator 30 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated lithium in the negative electrode 22 is depleted and the capacity of the lithium-ion battery 20 is diminished.

The lithium-ion battery 20 can be charged or re-powered at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium-ion battery 20 can include a variety of other components that while not depicted here are nonetheless known to those of skill in the art. For instance, the lithium-ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output and power density if it is required by the load device 42.

Accordingly, the lithium-ion battery 20 can generate electric current to a load device 42 that can be operatively connected to the external circuit 40. The load device 42 may be powered fully or partially by the electric current passing through the external circuit 40 when the lithium-ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy.

Any appropriate electrolyte 30, whether in solid form or solution, capable of conducting lithium ions between the negative electrode 22 and the positive electrode 24 may be used in the lithium-ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

The positive electrode 24 may be formed from any lithium-based active material that can sufficiently undergo lithium intercalation and deintercalation while functioning as the positive terminal of the lithium-ion battery 20. The positive electrode 24 may include a polymeric binder material to structurally fortify the lithium-based active material. One exemplary common class of known materials that can be used to form the positive electrode 24 is layered lithium transitional metal oxides. For example, in various embodiments, the positive electrode 24 may comprise at least one spinel, like lithium manganese oxide $(Li_{(1+x)}Mn_{(2-x)}O_4)$, where $0 \leq x \leq 1$, where x is typically less than 0.15, including $LiMn_2O_4$, lithium manganese nickel oxide, $(LiMn_{(2-x)}$ $Ni_xO_4$), where $0 \leq x \leq 1$ and, e.g., $LiMn_{1.5}Ni_{0.5}O_4$, lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, a lithium nickel cobalt metal oxide $LiNi_{(1-x-y)}Co_xM_yO_2$ (wherein $0<x<1$, $y<1$, and M may be Al, Mn, or the like), lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). A variety of other known lithium-based active materials may also be used. By way of non-limiting example, alternative materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide, ($LiMn_{(2-x)}Ni_xO_4$), where $0 \leq x \leq 1$, lithium manganese nickel cobalt oxide, (e.g., $LiMn_{1/3}Ni_{1/3}Co_{1/3}O_2$), or lithium iron phosphate ($LiFePO_6$). Such active materials may be intermingled with at least one polymeric binder, for example, by slurry casting active materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium-ion battery. The negative electrode 22 may also include another electrically conductive material, as well as one or more polymeric binder materials to structurally hold the lithium host material together. For example, in one embodiment, the negative electrode 22 may be formed from lithium titanate oxide (LTO) particles intermingled in at least one of polyvinylidene fluoride (PVDF), a nitrile butadiene rubber (NBR), styrene-butadiene rubber (SBR) binder, or carboxymethoxyl cellulose (CMC) as will be discussed in greater detail below, by way of non-limiting example. The negative electrode current collector 32 may be formed from copper or any other appropriate electrically conductive material known to those of skill in the art.

In various aspects of the present disclosure, the negative electrode 22 comprises an active material comprising $Li_4Ti_5O_{12}$ (LTO). LTO is capable of sufficiently undergoing lithium intercalation or alloying and de-intercalation or dealloying, while functioning as the negative terminal of the lithium-ion battery 20. When LTO is intercalated or alloyed with lithium ions, it transitions from $Li_4Ti_5O_{12}$ to $Li_{4+x}Ti_5O_{12}$, where x ranges from $0 \leq x \leq 3$ (where LTO in a fully intercalated or alloyed form is $Li_7Ti_5O_{12}$). In other aspects, the negative electrode 22 may comprise carbon, such as lithium-graphite intercalation compounds. As discussed previously, LTO is particularly useful as a negative electrode 22 active material, because it has outstanding electrochemical performance and furthermore has little to no volumetric change after lithium insertion. Thus, it is considered a zero-strain material providing superior long term stability.

Hence, LTO is a promising electrode material for lithium battery, due to its excellent cycling stability, current efficiency, rate capability. Furthermore, LTO can be designed as a nano-structured material for higher packing density and very high rate capacities. However, as discussed previously, one potential shortcoming to using LTO as a negative electrode 22 is that it appears that over time, at relatively high temperatures, and under certain charge conditions, LTO can generate significant amounts of gas within an electrochemical cell. As lithium-ion cells are typically hermetically sealed, such gas generation over time is undesirable. The predominant component in the gas generated by LTO in a lithium-ion battery is hydrogen ($H_2$), the generation of which appears to increase with temperature and state of charge (SoC). LTO and the typical active materials for cathodes (e.g., $(Li_{(1+x)}Mn_{(2-x)}O_4)$ do not themselves contain a source of hydrogen and thus do not by themselves generate hydrogen. While lithium electrolytes have a source of hydrogen (e.g., from non-aqueous solvents, like alkyl carbonates), the electrolytes are typically stable at ambient temperatures. The issue of gas generation seems to be specific to use of LTO or similar materials as negative electrode active materials, while changing the cathode active materials does not mitigate generation of the gas.

While not limiting the present teachings to any particular theory, it is theorized that components in the electrolyte solution can break down and form species that react with active metal oxides (LTO) to form hydrogen gas and other undesirable byproducts. For example, where an electrolyte comprises lithium hexafluorophosphate ($LiPF_6$), it can disassociate into LiF and $PF_5$ at high voltages (e.g., around 2.6V versus Li). $PF_5$ is a strong Lewis acid, which reacts with and consumes lithium ions in the electrochemical cell. Further, HF can be generated by undesirable reactions between certain electrolyte components and active hydroxides in LTO. While not limiting the present teachings to any particular theory, it is theorized that solvents, such as carbonate solvents in the electrolyte solution (by way of non-limiting example, alkyl carbonates like ethylene carbonate (EC) and ethylmethylcarbonate (EMC)) provide a source of hydrogen from the carbonates. Thus, the active metal oxides (LTO) may adsorb such solvents and/or act as a catalyst to promote chemical or electrochemical decomposition of the hydrogen source(s) from the electrolyte, thus forming hydrogen gas and other undesirable byproducts. This results in LTO reacting with electrolyte and consuming lithium to undesirably diminish battery capacity. Further, a reactive species like $PF_5$ can react with carbonate solvents, for example in a ring-opening reaction, to generate gaseous carbon dioxide ($CO_2$) and other undesired byproducts.

To address these issues, batteries incorporating LTO negative electrodes may be subjected to an aging process prior that involves heating the battery for a predetermined period prior to use to improve capacity retention and reduce gas formation. For example, a battery having an LTO electrode can be aged at about 70° C. for a week at 100% state of charge (SOC)/applied potential in one exemplary heated aging process. However, such heat-driven aging can undesirably reduce initial battery capacity by about 10% or more by consuming active lithium in the battery.

In various aspects, the present disclosure provides methods for pretreating an electrolyte for use in a lithium-ion electrochemical cell having an electroactive material comprising $Li_{(4+x)}Ti_5O_{12}$ (LTO), where $0 \leq x \leq 3$. In certain variations, the electroactive material comprising LTO may have an oxide-coated layer, which may use oxides (e.g., silicon dioxide ($SiO_2$) or silicon oxide ($SiO_x$)) coated LTO as active material, which can form a protective coating (e.g., comprising $P_xO_yF_z$) by reacting with the pretreatment composition without consuming the LTO active material.

The electrolyte is pretreated in a reaction that forms one or more protective compounds that minimize or suppress reaction of the LTO with potential active species in the electrolyte/electrochemical cell during operation. Thus, in certain aspects, the present disclosure provides a method of pretreating an electrolyte for a lithium-ion electrochemical cell. The method may include contacting an electrolyte comprising at least one lithium salt and a carbonate solvent.

A non-limiting list of lithium salts that may be dissolved in an organic solvent to form the non-aqueous liquid electrolyte solution include $LiPF_6$, $LiBF_4$, $LiClO_4$, $LiAlCl_4$, LiI, LiBr, LiSCN, $LiB(C_6H_5)_4$, $LiAsF_6$, $LiCF_3SO_3$, $LiN(CF_3SO_2)_2$, and combinations thereof. In certain variations, the non-aqueous electrolyte comprises a lithium fluoride salt. In certain variations, the electrolyte comprises lithium hexafluorophosphate ($LiPF_6$), lithium tetrafluoroborate ($LiBF_4$), and combinations thereof. In certain variations, the electrolyte comprises lithium hexafluorophosphate ($LiPF_6$). These and other similar lithium salts may be dissolved in a variety of organic solvents, including but not limited to various alkyl carbonates, such as cyclic carbonates (ethylene carbonate (EC), propylene carbonate, butylene carbonate), acyclic carbonates (dimethyl carbonate, diethyl carbonate, ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof. In one aspect, the electrolyte comprises lithium hexafluorophosphate ($LiPF_6$), lithium tetrafluoroborate ($LiBF_4$), and combinations thereof and a carbonate solvent, such as such as ethylene carbonate (EC), propylene carbonate, butylene carbonate, dimethyl carbonate, diethyl carbonate, ethylmethylcarbonate (EMC), and combinations thereof.

In certain aspects, the lithium fluoride salt is present in the electrolyte prior to treatment at greater than or equal to about 0.1% by weight to less than or equal to about 15% by weight, optionally at greater than or equal to about 0.1% by weight to less than or equal to about 10% by weight. The solvent may be present in the electrolyte at greater than or equal to about 85% by weight to less than or equal to about 99.9% by weight, optionally at greater than or equal to about 90% by weight to less than or equal to about 99.9% by weight.

The oxide species may be selected from the group consisting of: silicon dioxide ($SiO_2$), silicon oxides ($SiO_x$), where 1≤x≤2, titanium dioxide ($TiO_2$), and combinations thereof. The oxide species is selected from the group consisting of: silicon dioxide ($SiO_2$), silicon oxides ($SiO_x$), where 1≤x≤2, titanium dioxide ($TiO_2$), lithium oxide ($Li_2O$), sodium oxide ($Na_2O$), potassium oxide ($K_2O$), magnesium oxide (MgO), calcium oxide (CaO), barium oxide (BaO), aluminum oxide ($Al_2O_3$), and combinations thereof. In one aspect, the oxide species is selected from the group consisting of: silicon dioxide ($SiO_2$), silicon oxides ($SiO_x$), where 1≤x≤2, titanium dioxide ($TiO_2$), and combinations thereof. In certain variations, the oxide species comprises silicon (e.g., silicon dioxide ($SiO_2$), silicon oxides ($SiO_x$)) and may have an average particle size of greater than or equal to about 5 nm to less than or equal to about 50 μm and optionally has an average surface area of greater than or equal to about 10 m²/g to less than or equal to about 1,000 m²/g.

In one aspect, the contacting includes introducing the oxide species into an electrolyte, for example, in a reactor or container. The oxide species may be present in the electrolyte at greater than or equal to about 0.1% by weight to less than or equal to about 30% by weight.

In one aspect, the oxide species is provided in a filter and the contacting includes passing the electrolyte through the filter, where the oxide species is present in the filter at greater than or equal to about 50% by weight up to about 100% by weight.

A reaction occurs to form a pretreated electrolyte composition. For example, one or more disassociated constituents of a lithium fluoride salt present in the electrolyte can react with the oxide species to form one or more protective species. In this manner, the pretreated electrolyte having one or more compounds can be subsequently incorporated into a lithium-ion electrochemical cell having LTO as an electroactive material, while having minimal reactivity to diminish or suppress formation of any gases during use and high capacity levels are retained.

For example, while not limiting the present disclosure to any particular theory, it is believed that the following reactions represented by Equations 1 and 2 below occur when $SiO_2$ is used and $LiPF_6$ is present to form one or more protective compounds in a pretreated electrolyte composition.

$$LiPF_6 \rightarrow LiF + PF_5 \qquad \text{(Eqn. 1)}$$

$$2PF_5 + SiO_2 \rightarrow 2POF_3 + SiF_4 \qquad \text{(Eqn. 2)}$$

When the pretreated electrolyte composition is introduced into an electrochemical cell where LTO is present, it is believed that the following reaction designated Equation 3 may further occur under certain operating conditions. Notably, the protective species, like $POF_3$, $SiF_4$, and LiF can react with or precipitate from the pretreated electrolyte onto one or more exposed surfaces of the LTO to create a protective coating that further diminishes potential reactions within the cell. However, $SiF_4$ is gaseous and may be removed from the pretreated electrolyte. This evaporation/volatilization of $SiF_4$ from the pretreated electrolyte then promotes the reaction to form $P_xO_yF_z$ species like $POF_3$. The protective coating formed in situ in the electrochemical cell may be multiple layers or may be a single layer. In certain aspects, the protective coating may be a hybrid coating having multiple layers with distinct compositions.

$$12PF_5 + Li_4Ti_5O_{12} \rightarrow 12POF_3 + 5SiF_4 + 4LiF \qquad \text{(Eqn. 3)}$$

In another variation, where $TiO_2$ is present as the oxide species, it is believed that the following reactions represented by Equations 4 and 5 below occur during the pretreating of the electrolyte.

$$LiPF_6 \rightarrow LiF + PF_5 \qquad \text{(Eqn. 4)}$$

$$2PF_5 + TiO_2 \rightarrow 2POF_3 + TiF_4 \qquad \text{(Eqn. 5)}$$

When the pretreated electrolyte composition is introduced into an electrochemical cell where LTO is present, it is believed that the following reaction designated Equation 6 may further occur under certain operating conditions. The protective species, like $POF_3$, $TiF_4$, and LiF can react with or precipitate from the pretreated electrolyte onto one or more exposed surfaces of the LTO to create a protective coating that further diminishes potential reactions within the cell. The protective coating formed in situ in the electrochemical cell may be multiple layers or may be a single layer. In certain aspects, the protective coating may be a hybrid coating having multiple layers with distinct compositions.

$$12PF_5 + Li_4Ti_5O_{12} = 12POF_3 + 5TiF_4 + 4LiF \qquad \text{(Eqn. 6)}$$

Notably, while lithium tetrafluoroborate ($LiBF_4$) is less reactive than $LiPF_6$, $LiBF_4$ can also disassociate and react in an electrochemical cell where LTO is present and cause similar undesirable reactions in the absence of a protective species/protective coating.

In certain aspects, the pretreated electrolyte composition comprises a protective compound selected from the group consisting of: $M_aP_xO_yF_z$, $M_aP_xO_yF_zC_nH_m$, and combinations thereof, where when P in the formula is normalized to 1 so that x' is equal to about 1 (x'=1), $0<y\leq 4$, $0<z\leq 6$, $0\leq a\leq 3$, $0\leq n\leq 20$, $0\leq m\leq 42$, and M is selected from the group of elements: lithium (Li), sodium (Na), potassium (K), magnesium (Mg), calcium (Ca), barium (Ba), titanium (Ti), aluminum (Al), and combinations thereof.

In one variation, the pretreated electrolyte coating comprises a compound represented by $P_xO_yF_z$, where when P in the formula is normalized to 1 (x=1), $0<y\leq 4$, and $0<z\leq 6$. Notably, no metal M is present in this compound, so a=0 from the formula just above. In certain variations, the pretreated electrolyte coating comprising the compound represented by $P_xO_yF_z$ comprises fluorine (F) at greater than or equal to about 19% by weight to less than or equal to about 67% by weight. In one variation, the compound comprises $POF_3$.

In another variation, the pretreated electrolyte comprises a compound represented by $M_aP_xO_yF_z$, where when P is normalized to 1 (x=1) where $0<y\leq 4$, $0<z\leq 6$, $0\leq a\leq 3$. M is selected from the group of elements: lithium (Li), sodium (Na), potassium (K), magnesium (Mg), calcium (Ca), barium (Ba), titanium (Ti), aluminum (Al), and combinations thereof. Such a compound is a salt of a fluorophosphoric acid. In certain variations, M is lithium (Li). In certain other variations, the compound is represented by $M_aP_xO_yF_z$ and comprises fluorine (F) at greater than or equal to about 6% by weight to less than or equal to about 59% by weight. In one variation, the compound comprises $LiPOF_4$.

In yet another variation, the pretreated electrolyte comprises a compound represented by $P_xO_yF_zC_nH_m$ when P is normalized to 1 (x=1) where $0<y\leq 4$, $0<z\leq 6$, $0<n\leq 20$, and $0\leq m\leq 42$. Notably, no metal M is present in this compound, so a=0 from the formula just above. Such a compound may comprise fluorine (F) at greater than or equal to about 4% by weight to less than or equal to about 50% by weight. In one variation, the compound comprises $PO_3FC_2H_6$.

In a further variation, the pretreated electrolyte includes a compound represented by $M_aP_xO_yF_zC_nH_m$ comprising fluorine (F) at greater than or equal to about 1% by weight to less than or equal to about 48% by weight. In certain variations, M is lithium (Li). In one variation, the compound comprises $LiPO_3F_2C_2H_6$.

In one variation, where the oxide species comprises titanium dioxide ($TiO_2$) and a pretreated electrolyte may also include titanium tetrafluoride ($TiF_4$).

Notably, the protective species, like $P_xO_yF_z$, $M_aP_xO_yF_z$, $P_xO_yF_zC_nH_m$, $M_aP_xO_yF_zC_nH_m$, and combinations thereof, as well as $TiF_4$ and/or LiF can precipitate from the pretreated electrolyte and deposit and/or react with one or more exposed surfaces of the LTO to create a protective coating that further diminishes potential reactions within the cell. Where the LTO has a precoated surface with oxides, like silicon oxides, the oxides also area reactive with certain species, can form $P_xO_yF_z$ without consuming LTO, and thus when present can contribute to the reactions and formation of the protective coatings.

In various aspects, the protective surface coating formed in situ by the presence of the one or more protective compounds in the pretreated electrolyte can create a thin layer on one or more exposed surface regions of the electroactive material comprising lithium titanate, which provides sufficient coverage of the exposed surface regions of LTO to minimize adsorption and/or reaction of solvents and other hydrogen source species in the battery cell, while minimizing electrical impedance at the electroactive material surface. The protective surface coating may cover greater than or equal to about 70% of the exposed surface area of the electroactive material, optionally greater than or equal to about 75%, optionally greater than or equal to about 80%, optionally greater than or equal to about 85%, optionally greater than or equal to about 90%, optionally greater than or equal to about 95%, optionally greater than or equal to about 97%, optionally greater than or equal to about 98%, optionally greater than or equal to about 99%, and in certain variations, optionally greater than or equal to about 99.5% of the exposed surface area of the electroactive material.

A thickness of the surface coating may be considered to be the region of the surface of the LTO that has the deposited compounds that form a distinct chemical composition. In certain variations, an overall thickness of the surface coating (including multiple layers) on the electroactive material is greater than or equal to about 1 nm to less than or equal to about 1 micrometers (µm), optionally greater than or equal to about 3 nm to less than or equal to about 75 micrometers (µm), and in certain aspects, optionally greater than or equal to about 5 nm to less than or equal to about 50 micrometers (µm).

Where the oxide species comprises silicon (for example, silicon dioxide ($SiO_2$) or silicon oxides ($SiO_x$), where $1\leq x\leq 2$), the silicon-containing oxide is a desiccant and hygroscopic. Thus, during treatment, any water that is present or formed during the reaction can be removed. Furthermore, where residual unreacted oxide species remain in the pretreated electrolyte, water can be bound to the hygroscopic species, thus minimizing or avoiding undesirable side reactions with reactive species during lithium ion battery operation.

In certain aspects, the method comprises contacting an electrolyte comprising a lithium fluoride salt (e.g., lithium hexafluorophosphate ($LiPF_6$)) and a carbonate solvent with an oxide species selected from the group consisting of: silicon dioxide ($SiO_2$), silicon oxides ($SiO_x$), where $1\leq x\leq 2$, titanium dioxide ($TiO_2$), and combinations thereof, so that a reaction occurs to form a pretreated electrolyte comprising a protective compound. The contacting optionally occurs for greater than or equal to about 30 minutes to less than or equal to about 72 hours. In certain aspects, the contacting occurs at a temperature of greater than or equal to about 45° C. to less than or equal to about 120° C.

In certain aspects, the oxide species is in a powder form comprising a plurality of particles and the contacting comprises mixing the plurality of particles with the electrolyte. The particles may be stirred or mixed in the electrolyte.

In certain other aspects, a filter comprises the oxide species. The contacting comprises passing the electrolyte through the filter so that the reaction occurs as the electrolyte passes through the filter. The filter may be formed of a silicon dioxide ($SiO_2$), silicon oxides ($SiO_x$), or titanium dioxide ($TiO_2$) material or the filter may be embedded with the particles of the oxide species particles.

The method may further comprise filtering the electrolyte after the contacting and the reaction occurs. For example, the filtering may remove any particulate species from the electrolyte, such as residual oxide species. In this manner, the pretreated electrolyte may be substantially free of any particulate species, such as the oxide species.

In certain aspects, the contacting and reacting to form the pretreated electrolyte occurs without any applied electric potential (e.g., external applied voltage or external applied current).

Figure 2:
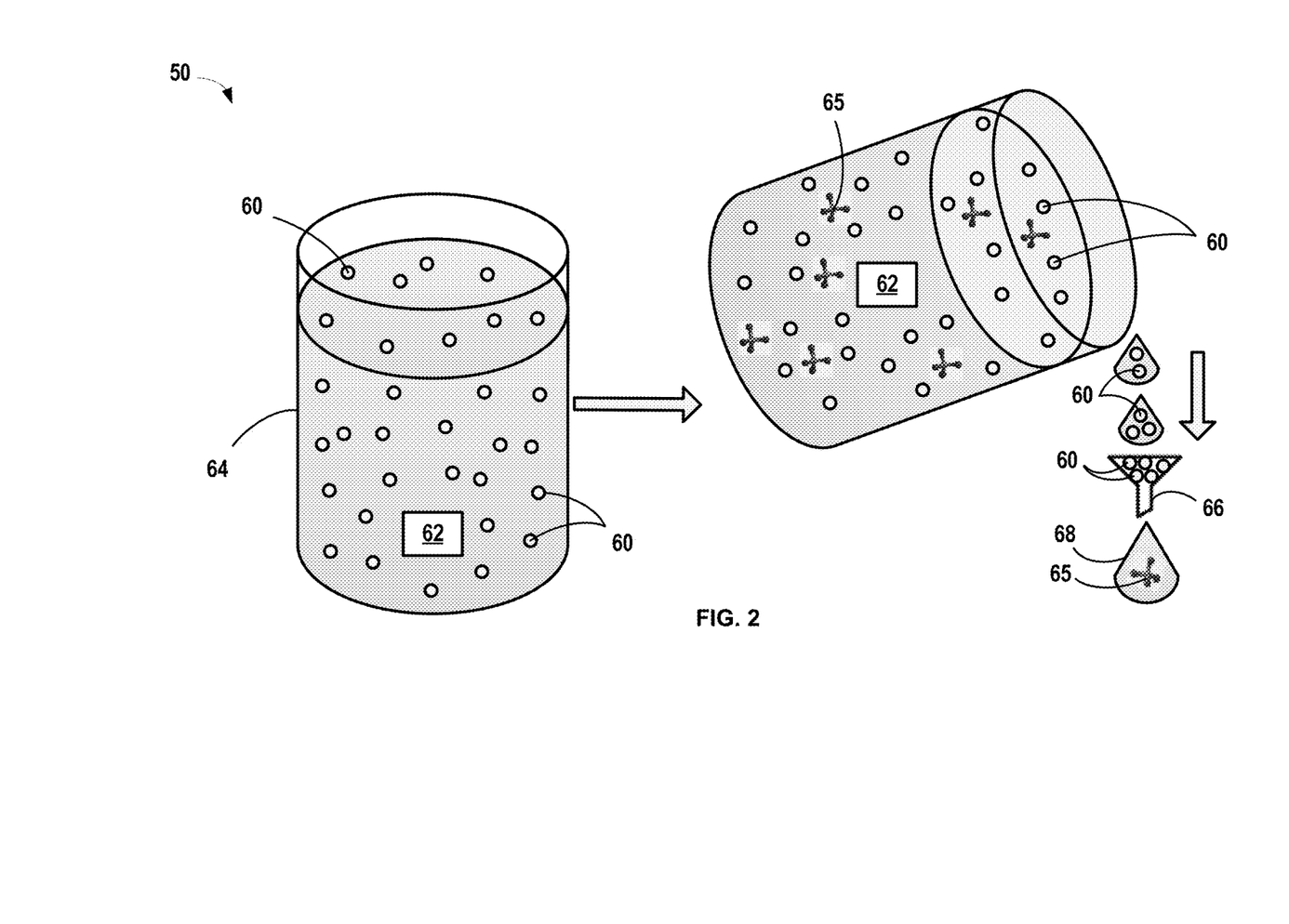
FIG. 2 is a schematic showing a simplified batch process for pretreating an electrolyte by introducing a plurality of oxide species particles to form one or more protective species according to certain aspects of the present disclosure.

In one variation, shown in FIG. 2, a method of pretreating the electrolyte is conducted in a batch process 50. The oxide species is in the form of particles 60. The pretreating process may include introducing the particles 60 into an electrolyte comprising the lithium fluoride salt and carbonate-based solvent. The electrolyte 62 and particles 60 may be mixed in a vessel 64 and heat may be applied to facilitate reaction between the reactive compounds in the electrolyte 62 and the oxide species particles 60. One or more protective compounds 65 are formed by the reaction. The reaction may be conducted for a predetermined time and at a predetermined temperature, as noted above. The predetermined time for reaction depends on the rate of reaction, concentration of reactive precursors, and temperature, but may vary from greater than or equal to about 30 minutes to less than or equal to about 72 hours by way of example. Suitable temperatures for the pretreatment process may be greater than or equal to about 45° C. In certain variations, the temperature may be greater than or equal to about 45° C. to less than or equal to about 120° C., optionally greater than or equal to about 50° C. to less than or equal to about 100° C.

It should be noted that in contrast to the aging process that is conducted for an LTO active material that is fully assembled in an electrochemical cell (e.g., having both electrodes, separator, and electrolyte), the present methods pretreat the electrolyte external to the electrochemical cell. Thus, the temperatures that can be used may be far greater in the pretreatment process according to the present disclosure due to the absence of temperature sensitive components like the polymeric separator and polymeric binders. Furthermore, a pretreatment process that occurs prior to fabricating the lithium-ion electrochemical cell does not consume active lithium in the cell and thus does not sacrifice initial capacity, as occurs otherwise during the aging process. If lithium ions from the electrolyte are consumed or reduced in the pretreated electrolyte, additional lithium salts can be added to the pretreated electrolyte prior to incorporation in a lithium-ion electrochemical cell.

After one or more protective compounds are formed within the electrolyte 62 by reaction of certain constituents in the electrolyte with the oxide species, the particles 60 may optionally be separated from the electrolyte 62 by a separation process, such as filtration with a filter 66. The particles 60 are separated from the filtered pretreated electrolyte 68 where the one or more protective compounds 65 remain. The pretreated electrolyte 68 with the one or more protective compounds 65 is collected. The pretreatment process may be repeated, if necessary to increase an amount of protective compounds present in the pretreated electrolyte. Various reactor vessels and separation devices may be used as known in the art, including free standing devices, beds, packed beds, sieves, dryers, and the like. It should be noted that the exemplary process in FIG. 2 is merely a simplified representation and may include various other configurations and components, such as valves, gauges, pumps, heat sources, and other equipment not shown. The pretreated electrolyte 68 can then be used in a subsequent lithium-ion electrochemical cell formation process.

For example, in certain variations, an electrode membrane, such as an anode membrane, may be formed with an electrode active material (e.g., LTO) dispersed in a polymeric binder matrix over a current collector. A separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, the pretreated electrolyte is injected into the separator (and may also be imbibed into the positive and/or negative electrodes) suitable for lithium ion transport. In certain aspects, the laminated battery is further hermetically sealed prior to use.

Figure 3:
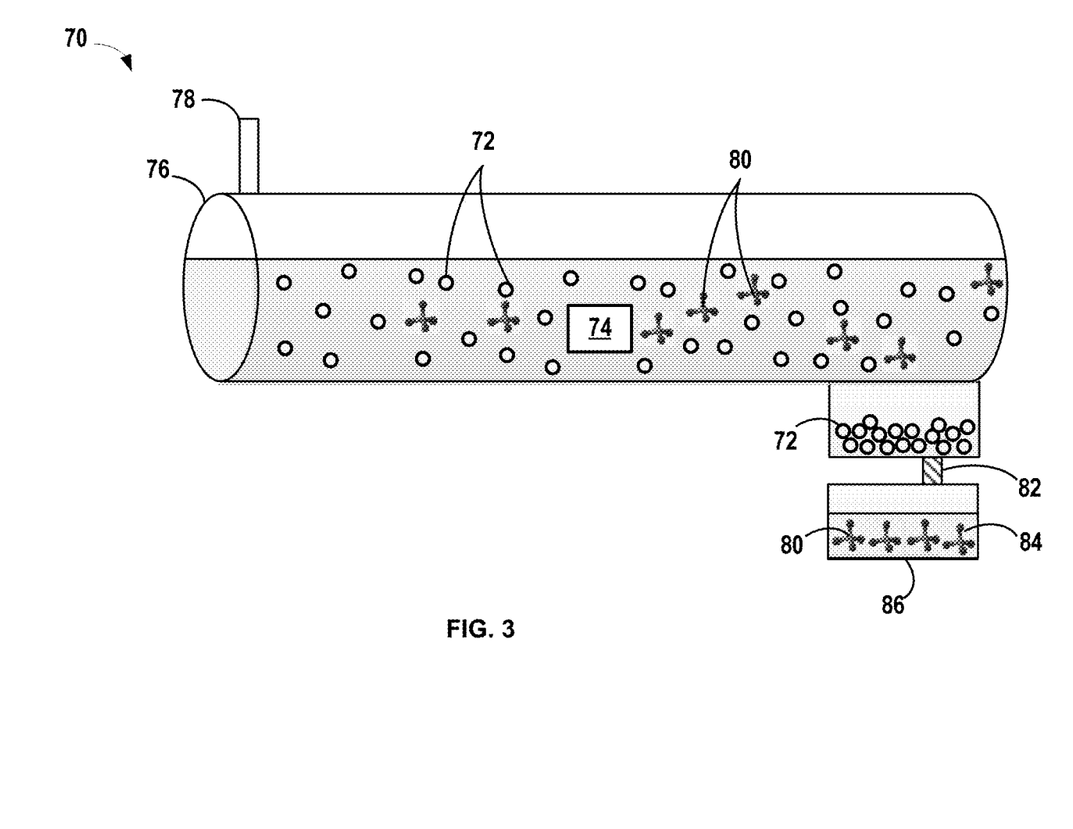
FIG. 3 is a schematic showing a simplified continuous process for pretreating an electrolyte to form one or more protective species in a continuous flow reactor by mixing the electrolyte with a plurality of oxide species particles according to certain aspects of the present disclosure.

In another variation shown in FIG. 3, a pretreatment method is conducted in a continuous flow process 70. It should be noted that the exemplary process in FIG. 3 is a simplified representation and may include various other components, such as valves, gauges, pumps, heat sources, and other equipment not shown. Aspects of the continuous flow process 70 that are the same as those of the batch process 50 will not be repeated herein for brevity. The oxide species is in the form of particles 72. The pretreating process may include introducing the particles 72 into an electrolyte 74. The particles 72 may form a gel. The electrolyte liquid 74 and particles 72 may be mixed in a vessel 76 like a continuous flow reactor. The vessel 76 includes at least one inlet 78 to introduce the electrolyte 74 and/or the particles 72. While not shown, two distinct inlets may introduce the particles 72 separately from the electrolyte 74 in an alternative design.

The vessel 76 may be continuously stirred or agitated and may have a source of heat that is applied to facilitate reaction between the reactive compounds in the electrolyte 74 and the oxide particles 72. The size and flow rate within the vessel 76 thus provide an appropriate residence time for the particles within the reactor to react and form one or more protective compounds 80. Residence time (T) may be determined by mass of the particles in the reactor (m) divided by the flow rate within the reactor $$(q)\left(\tau = \frac{m}{q}\right).$$

The residence time for reaction depends on the rate of reaction, concentration of reactive precursors, and temperature, but may vary from greater than or equal to about 10 minutes to less than or equal to about 72 hours by way of example.

Suitable temperatures for the pretreatment process may be similar to those described in the context of the batch process, for example, greater than or equal to about 45° C. After the one or more protective compounds 80 are formed in the electrolyte 74, the oxide particles 72 may optionally be separated from the electrolyte 74 by a separation process, such as filtration with a filter 82 to collect a pretreated electrolyte 84 having the protective compounds 80 in a receptacle 86. In other alternative variations, the oxide particles 72 may remain in the pretreated electrolyte 84. The oxide particles 72 are separated from a liquid effluent exiting the vessel 76 via at least one outlet 86. One or multiple filters can be placed in the flow reactor vessel 76 along the solvent flow pass to collect particles 72 after reaction. While not shown, two distinct outlets may be employed to remove and separate the particles 72 from the electrolyte 74 in an alternative design. The pretreated electrolyte 84 having the one or more protective compounds 80 can then be used in a subsequent lithium-ion electrochemical cell comprising an LTO electrode.

Figure 4:
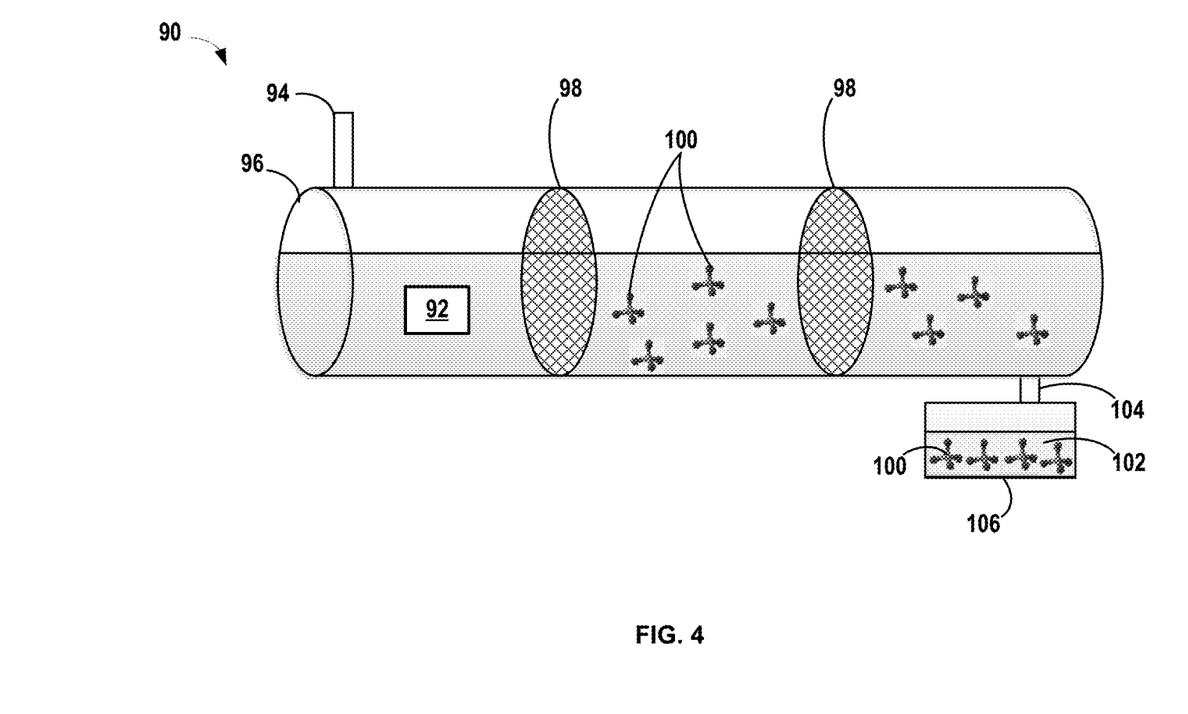
FIG. 4 is a schematic showing another simplified continuous process for pretreating an electrolyte to form one or more protective species in a continuous flow reactor by passing electrolyte through a filter including an oxide species according to certain aspects of the present disclosure.

In another variation shown in FIG. 4, a process 90 a pretreatment method is conducted in a continuous flow process 70 where the oxide species is provided as one or more filters. It should be noted that the exemplary process in FIG. 4 is a simplified representation and may include various other components, such as valves, gauges, pumps, heat sources, and other equipment not shown. Aspects of process 90 that are shared with the continuous flow process 70 in FIG. 3 and batch process 50 in FIG. 2 will not be repeated herein for brevity. The pretreating process may include introducing an electrolyte 92 into at inlet 94 of a vessel 96 like a continuous flow reactor. The oxide species is in the form of a plurality of filters 98. The filters 98 may be formed of silicon dioxide ($SiO_2$), silicon oxides ($SiO_x$), or titanium dioxide ($TiO_2$) material or the filters 98 may be embedded with the particles of the oxide species particles. It should be noted that a single filter 98 or more than two filters 98 may also be used.

Electrolyte 92 flows continuously down the vessel 96. The vessel 96 may be continuously stirred or agitated and may have a source of heat that is applied to facilitate reaction between the reactive compounds in the electrolyte 92 and the oxide in the filters 98. The size and flow rate within the vessel 96 thus provide an appropriate residence time for the electrolyte within the reactor to react and form one or more protective compounds 100. The residence time for reaction depends on the rate of reaction, concentration of reactive precursors, and temperature, but may vary from greater than or equal to about 30 minutes to less than or equal to about 72 hours by way of example. Suitable temperatures for the pretreatment process may similar to those described above, for example, greater than or equal to about 45° C. After the one or more protective compounds 100 are formed in the electrolyte 92, the pretreated electrolyte 102 and the one or more protective compounds 100 may pass through an exit 104 of the vessel 96 and be collected in a receptacle 106. The pretreated electrolyte 102 having the one or more protective compounds 100 can then be used in a subsequent lithium-ion electrochemical cell comprising an LTO electrode.

In certain variations, a method of forming a lithium-ion electrochemical cell comprises pretreating an electrolyte comprising lithium hexafluorophosphate ($LiPF_6$) and a carbonate solvent by contacting the electrolyte with an oxide species selected from the group consisting of: silicon dioxide ($SiO_2$), silicon oxides ($SiO_x$), titanium dioxide ($TiO_2$), lithium oxide ($Li_2O$), sodium oxide ($Na_2O$), potassium oxide ($K_2O$), magnesium oxide (MgO), calcium oxide (CaO), barium oxide (BaO), aluminum oxide ($Al_2O_3$), and combinations thereof. In certain variations, the oxide species is selected from the group consisting of: silicon dioxide ($SiO_2$), silicon oxides ($SiO_x$), titanium dioxide ($TiO_2$), and combinations thereof. A reaction occurs to form a pretreated electrolyte comprising a compound selected from the group consisting of: $M_aP_xO_yF_z$, $M_aP_xO_yF_zC_nH_m$, and combinations thereof, where when P in the formula is normalized to 1 so that x' is equal to about 1 (x'=1), $0<y\leq4$, $0<z\leq6$, $0\leq a\leq3$, $0\leq n\leq20$, $0\leq m\leq42$. M is selected from the group of elements: lithium (Li), sodium (Na), potassium (K), magnesium (Mg), calcium (Ca), barium (Ba), titanium (Ti), aluminum (Al), and combinations thereof. The compound may be selected from the group consisting of: $P_xO_yF_z$, $M_aP_xO_yF_z$, $P_xO_yF_zC_nH_m$, $M_aP_xO_yF_zC_nH_m$, and combinations thereof.

The method further includes introducing the pretreated electrolyte into a lithium-ion electrochemical cell or battery.

The present disclosure contemplates a lithium-ion electrochemical cell or battery comprising the pretreated electrolyte having one or more protective compounds. The battery may have a laminated cell structure, comprising a negative electrode or anode layer, a positive electrode or cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

The lithium-ion electrochemical cell comprises a negative electrode comprising $Li_{(4+x)}Ti_5O_{12}$ (LTO), where $0\leq x\leq3$, a positive electrode, and a separator. The pretreated electrolyte comprising lithium hexafluorophosphate ($LiPF_6$) and $P_xO_yF_z$, $M_aP_xO_yF_z$, $P_xO_yF_zC_nH_m$, and/or $M_aP_xO_yF_zC_nH_m$ compounds that stabilize the exposed surfaces of the electroactive material comprising LTO and thus serve to reduce and suppress electrolyte decomposition and gas formation/generation during lithium-ion electrochemical cell operation. In certain aspects, any electroactive material comprising LTO that is exposed to the pretreated electrolyte in the electrochemical cell has a protective surface coating formed thereon. This serves to improve the safety and battery life when using LTO as the negative electrode active material. This is especially advantageous to improve useful life for start-stop lithium-ion batteries.

In this manner, the protective compounds present in the pretreated electrolyte are capable of suppressing In this manner, the protective surface coating is capable of suppressing greater than or equal to about 50% of gases that would otherwise be generated by a comparative electroactive material comprising LTO that is the same as the LTO on which the protective surface coating is formed, but that lacks the protective surface coating. In certain aspects, the surface coating suppresses greater than or equal to about 60%, optionally 65%, optionally 70%, optionally 75%, optionally 80%, optionally 85%, optionally 90%, optionally 95%, optionally 97%, optionally 98%, optionally 99%, optionally 99.5%, optionally 99.7%, optionally 99.8%, optionally 99.9%, and in certain aspects, 99.99% of gases that would otherwise be generated by a comparative lithium-ion electrochemical cell having a bare LTO material (of the same LTO material) and lacking any protective compound(s).

In certain aspects, a lithium-ion battery, comprising LTO and the pretreated electrolyte does not generate any or generates only minimal amounts of gaseous compounds during the life of the battery. For example, in certain aspects, an electrochemical cell or lithium-ion battery comprising an LTO electroactive material and a pretreated electrolyte with one or more protective compounds formed according to certain variations of the present disclosure is substantially free of gaseous compounds through the life of the electrochemical cell or battery. "Substantially free" is intended to mean that the compound is absent to the extent that it cannot be detected or that if the compound is present, it does not cause undue detrimental impact and/or prevent the overall use of the battery for its intended purpose. In some aspects, a concentration of gaseous compounds generated in the electrochemical cell is less than about 1,000 parts per million (ppm), optionally less than about 500 ppm, optionally less than about 100 ppm, optionally less than about 75 ppm, and in some preferred aspects, optionally less than about 50 ppm when the electrochemical cell or battery is stored over time. In other aspects, the electrolyte and lithium-ion electrochemical cell are substantially free of water.

In some aspects, the gases generated correspond to less than or equal to about 0.1% of the sealed cell volume when the gas volume is evaluated at standard temperature and pressure (298 K, 1 atm) conditions, for example, after 100 hours of storage or more; optionally less than or equal to about 0.05% of the sealed cell volume; and in certain aspects, optionally less than or equal to about 0.01% of the sealed cell volume at standard temperature and pressure conditions.

In certain aspects, the lithium-ion electrochemical cell having an electroactive material comprising LTO and incorporating a pretreated electrolyte comprising one or more protective compounds for suppressing gas formation has a rate capacity of greater than or equal to about 0.05 C (C/20) and greater than or equal to about 20 Coulombs, where the lithium-ion electrochemical cell is substantially free of gas generation for a standard lifetime of the electrochemical cell. A lithium-ion electrochemical cell incorporating a pretreated electrolyte comprising one or more protective compounds prepared in accordance with certain aspects of the present teachings may have an initial discharge capacity of greater than or equal to about 0.117 A·h.

In certain variations, a lithium-ion battery incorporating a pretreated electrolyte comprising one or more protective compounds for suppressing gas formation having an electroactive material comprising LTO prepared in accordance with certain aspects of the present disclosure is substantially free of gaseous species for at least 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling). In certain variations, a lithium-ion battery incorporating an electroactive material comprising LTO and a pretreated electrolyte comprising one or more protective compounds for suppressing gas formation prepared in accordance with certain aspects of the present disclosure is substantially free generated gaseous species for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years.

Stated in another way, in certain aspects, a lithium-ion battery or electrochemical cell incorporating an electroactive material comprising LTO and a pretreated electrolyte comprising one or more protective compounds for suppressing gas formation prepared in accordance with certain aspects of the present disclosure will be substantially free of gaseous species for at least 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

Methods according to certain aspects of the present disclosure increase the stability of electrolytes on LTO electrodes, by pre-treating electrolyte and forming LTO surface-protective species. Thus, a pretreated electrolyte with one or more protective compounds can form a protective coating and reduce reaction with LTO materials or an LTO electrode that improves battery life and reduces gassing. The protecting species formed during electrolyte pre-treatment reduces electrolyte decomposition and gas formation during LTO battery operation.

Further, the protective species increase cell capacity by reducing loss of cyclable lithium that occurs during battery formation. The pretreated electrolyte with one or more protective compounds can thus serve to increase battery capacity and improve battery life, thus reducing weight and/or increasing vehicle range.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of pretreating an electrolyte for a lithium-ion electrochemical cell, the method comprising:
    introducing an oxide species and an electrolyte comprising a lithium salt and a carbonate solvent into a reactor vessel for a reaction, wherein the lithium salt is selected from the group consisting of: lithium hexafluorophosphate ($LiPF_6$), lithium tetrafluoroborate ($LiBF_4$), and combinations thereof and the oxide species is selected from the group consisting of: silicon dioxide ($SiO_2$), silicon oxides ($SiO_x$), where $1 \leq x \leq 2$, titanium dioxide ($TiO_2$), lithium oxide ($Li_2O$), sodium oxide ($Na_2O$), potassium oxide ($K_2O$), magnesium oxide (MgO), calcium oxide (CaO), barium oxide (BaO), aluminum oxide ($Al_2O_3$), and combinations thereof, so that the reaction occurs in the reactor vessel to form a pretreated electrolyte comprising a compound selected from the group consisting of: $M_aP_{x'}O_yF_z$, $M_aP_{x'}O_yF_zC_nH_m$, and combinations thereof, wherein P is normalized so that $x'=1$, $0<y\leq4$, $0<z\leq6$, $0\leq a\leq3$, $0\leq n\leq20$, $0\leq m\leq42$, and M is selected from the group of elements: lithium (Li), sodium (Na), potassium (K), magnesium (Mg), calcium (Ca), barium (Ba), titanium (Ti), aluminum (Al), and combinations thereof; and
    removing the pretreated electrolyte from the reactor vessel.

2. The method of claim 1, wherein a residence time in the reactor vessel for the electrolyte and the oxide species is greater than or equal to about 30 minutes to less than or equal to about 72 hours.

3. The method of claim 1, wherein the oxide species is selected form the group consisting of: silicon dioxide ($SiO_2$), silicon oxides ($SiO_x$), where $1 \leq x \leq 2$, titanium dioxide ($TiO_2$), and combinations thereof.

4. The method of claim 1, wherein a temperature in the reactor vessel is greater than or equal to about 45° C. to less than or equal to about 120° C.

5. The method of claim 1, wherein the oxide species is in a powder form comprising a plurality of particles and the method further comprises mixing the plurality of particles with the electrolyte prior to the introducing.

6. The method of claim 1, further comprising filtering the electrolyte after the introducing and after the reaction occurs in the reactor vessel.

7. The method of claim 1, further comprising passing the pretreated electrolyte through a filter that comprises the oxide species.

8. The method of claim 1, wherein the compound is represented by $P_xO_yF_z$ comprising fluorine (F) at greater than or equal to about 19% by weight to less than or equal to about 67% by weight.

9. The method of claim 1, wherein the compound is represented by $M_aP_xO_yF_z$, comprising fluorine (F) at greater than or equal to about 6% by weight to less than or equal to about 59% by weight.

10. The method of claim 9, where M is lithium (Li).

11. The method of claim 1, wherein the compound is represented by $P_xO_yF_zC_nH_m$ comprising fluorine (F) at greater than or equal to about 4% by weight to less than or equal to about 50% by weight.

12. The method of claim 1, wherein the compound is represented by $M_aPO_yF_zC_nH_m$ comprising fluorine (F) at greater than or equal to about 1% by weight to less than or equal to about 48% by weight.

13. The method of claim 12, where M is lithium (Li).

14. The method of claim 1, wherein the oxide species is present in the electrolyte at greater than or equal to about 0.1% by weight to less than or equal to about 30% by weight.

15. The method of claim 1, further comprising passing the pretreated electrolyte through a filter, wherein the filter comprises the oxide species present at greater than or equal to about 50% by weight up to about 100% by weight in the filter.

16. The method of claim 1, further comprising:
introducing the pretreated electrolyte into a lithium-ion electrochemical cell comprising a negative electrode comprising $Li_{(4+x)}Ti_5O_{12}$ (LTO), where $0 \leq x \leq 3$, a positive electrode, and a separator, wherein the compound present in the pretreated electrolyte minimizes reaction of reactive species with the LTO and suppresses gas formation during lithium-ion electrochemical cell operation.

17. The method of claim 16, wherein the oxide species is selected form the group consisting of: silicon dioxide ($SiO_2$), silicon oxides ($SiO_x$), where $1 \leq x \leq 2$, titanium dioxide ($TiO_2$), and combinations thereof.

18. The method of claim 16, wherein the lithium-ion electrochemical cell has an initial charge capacity of greater than or equal to about 0.117 A·h.

19. A method of pretreating an electrolyte for a lithium-ion electrochemical cell, the method comprising:
introducing an oxide species and an electrolyte comprising a lithium salt and a carbonate solvent into a reactor vessel for a reaction, wherein the lithium salt is selected from the group consisting of: lithium hexafluorophosphate ($LiPF_6$), lithium tetrafluoroborate ($LiBF_4$), and combinations thereof and the oxide species is selected from the group consisting of: silicon dioxide ($SiO_2$), silicon oxides ($SiO_x$), where $1 \leq x \leq 2$, titanium dioxide ($TiO_2$), lithium oxide ($Li_2O$), sodium oxide ($Na_2O$), potassium oxide ($K_2O$), magnesium oxide (MgO), calcium oxide (CaO), barium oxide (BaO), aluminum oxide ($Al_2O_3$), and combinations thereof, so that the reaction occurs in the reactor vessel to form a compound selected from the group consisting of: $M_aP_xO_yF_z$, $M_aP_xO_yF_zC_nH_m$, and combinations thereof, wherein P is normalized so that $x'=1$, $0<y \leq 4$, $0<z \leq 6$, $0 \leq a \leq 3$, $0 \leq n \leq 20$, $0 \leq m \leq 42$, and M is selected from the group of elements: lithium (Li), sodium (Na), potassium (K), magnesium (Mg), calcium (Ca), barium (Ba), titanium (Ti), aluminum (Al), and combinations thereof; and
separating and removing the oxide species from the electrolyte to form a pretreated electrolyte for the lithium-ion electrochemical cell comprising the compound, the lithium salt, and the carbonate solvent.

20. A method of pretreating an electrolyte for a lithium-ion electrochemical cell, the method comprising:
introducing an oxide species and an electrolyte comprising a lithium salt and a carbonate solvent into a reactor vessel for a reaction, wherein the lithium salt is selected from the group consisting of: lithium hexafluorophosphate ($LiPF_6$), lithium tetrafluoroborate ($LiBF_4$), and combinations thereof and the oxide species comprises titanium dioxide ($TiO_2$), so that the reaction occurs in the reactor vessel to form a pretreated electrolyte comprising a compound selected from the group consisting of: $M_aP_xO_yF_z$, $M_aP_xO_yF_zC_nH_m$, and combinations thereof, wherein P is normalized so that $x'=1$, $0<y \leq 4$, $0<z \leq 6$, $0 \leq a \leq 3$, $0 \leq n \leq 20$, $0 \leq m \leq 42$, and M is selected from the group of elements: lithium (Li), sodium (Na), potassium (K), magnesium (Mg), calcium (Ca), barium (Ba), titanium (Ti), aluminum (Al), and combinations thereof and the pretreated electrolyte further comprises titanium tetrafluoride ($TiF_4$); and
removing the pretreated electrolyte from the reactor vessel.

* * * * *